US012601499B2

(12) United States Patent
Franco Gutierrez et al.

(10) Patent No.: US 12,601,499 B2
(45) Date of Patent: Apr. 14, 2026

(54) FOOD PREPARATION SYSTEM

(71) Applicant: BSH Hausgeräte GmbH, Munich (DE)

(72) Inventors: Carlos Franco Gutierrez, Saragossa (ES); Teresa Del Carmen Marzo Alvarez, Saragossa (ES); Maria Parra Borderías, Saragossa (ES); Agostina Rodriguez Larrosa, Saragossa (ES); Beatriz Villanueva Valero, Saragossa (ES)

(73) Assignee: BSH Hausgeräte GmbH, Munich (DE)

( * ) Notice: Subject to any disclaimer, the term of this patent is extended or adjusted under 35 U.S.C. 154(b) by 972 days.

(21) Appl. No.: 17/768,498

(22) PCT Filed: Oct. 20, 2020

(86) PCT No.: PCT/EP2020/079490
§ 371 (c)(1),
(2) Date: Apr. 13, 2022

(87) PCT Pub. No.: WO2021/083739
PCT Pub. Date: May 6, 2021

(65) Prior Publication Data
US 2024/0099507 A1 Mar. 28, 2024

(30) Foreign Application Priority Data
Oct. 30, 2019 (EP) ..................................... 19382948

(51) Int. Cl.
*F24C 7/08* (2006.01)
*G05B 19/042* (2006.01)

(52) U.S. Cl.
CPC ............ *F24C 7/086* (2013.01); *G05B 19/042* (2013.01); *G05B 2219/2643* (2013.01)

(58) Field of Classification Search
CPC ........ A47J 36/321; F24C 7/08; G05B 19/042; G05B 2219/2643
See application file for complete search history.

(56) References Cited

U.S. PATENT DOCUMENTS

2013/0092032 A1* 4/2013 Cafferty ................... F24C 7/08
                                              99/325
2015/0066516 A1* 3/2015 Nishikawa ............... F24C 7/08
                                              704/275
2018/0095809 A1* 4/2018 Hong ...................... G06F 9/542

FOREIGN PATENT DOCUMENTS

DE        102013226362 A1 * 6/2015 ......... A47L 15/0063

OTHER PUBLICATIONS

International Search Report PCT/EP2020/079490 dated Dec. 11, 2020.

* cited by examiner

*Primary Examiner* — Thien S Tran
(74) *Attorney, Agent, or Firm* — Michael E. Tschupp; Andre Pallapies; Brandon G. Braun

(57) ABSTRACT

A food preparation system includes a control unit designed to guide through a process step of a process and to initiate, during guidance through the process, a machine-user interaction which is independent of the guidance through the process.

17 Claims, 9 Drawing Sheets

FOOD PREPARATION SYSTEM

CROSS-REFERENCES TO RELATED APPLICATIONS

This application is the U.S. National Stage of International Application No. PCT/EP2020/079490, filed Oct. 20, 2020, which designated the United States and has been published as International Publication No. WO 2021/083739 A1 and which claims the priority of European Patent Application, Serial No. 19382948.8, filed Oct. 30, 2019, pursuant to 35 U.S.C. 119 (a)-(d).

The contents of International Application No. PCT/EP2020/079490 and European Patent Application, Serial No. 19382948.8 are incorporated herein by reference in their entireties as if fully set forth herein.

BACKGROUND OF THE INVENTION

The invention relates to a food preparation system and a method for an operation of a food preparation system.

A food preparation system which has an output unit and a control unit is already known from the prior art. In an operating state, the control unit guides through a process step of a process via the output unit. During the guidance through the process, the control unit guides through each process step individually and outputs each process step individually via the output unit. The control unit may initiate a machine-user interaction which is independent of the process, either chronologically before the guidance through the process or chronologically after the guidance through the process.

BRIEF SUMMARY OF THE INVENTION

The object of the invention, in particular but not limited thereto, is to provide a generic system having improved properties in terms of ease of use.

The invention is based on a food preparation system, in particular having at least one output unit and having at least one control unit which is designed, in particular, to control and/or regulate the output unit and which is designed to guide through at least one process step of at least one process, in particular via the output unit.

It is proposed that the control unit is designed at least to initiate, during guidance through the process, in particular via the output unit, a machine-user interaction which is independent of the guidance through the process.

In particular, a high level of ease of use may be achieved by means of such an embodiment. In particular, a high level of flexibility may be achieved since the machine-user interaction may be at least initiated, in particular, at any times and namely advantageously also during the guidance through the process. In particular, during the guidance through the process a high level of flexibility and/or handling freedom may be provided to a user by means of the machine-user interaction, in which the machine-user interaction may be at least initiated in a convenient and/or simple manner if required.

A "food preparation system" is intended to be understood to mean, in particular, a system which has at least one functional unit, the main function thereof being a preparation of at least one food, and which in particular may also have at least one further functional unit, the main function thereof deviating from a preparation of at least one food. For example, the functional unit, the main function thereof in particular being a preparation of at least one food, could be a cooking appliance and advantageously a hob. In an operating state, the functional unit heats and/or warms and/or cooks, in particular, at least one food and namely, in particular, for the purpose of a preparation of the food.

In particular, in an operating state the functional unit executes at least one cooking appliance main function. In particular, the functional unit is part of a cooking appliance and in an operating state executes, in particular, the cooking appliance main function of the cooking appliance. In an operating state, the functional unit could execute, for example, at least one heating function and/or at least one cooking function. The food preparation system has, in particular, at least one and advantageously at least the cooking appliance.

The cooking appliance could be configured, for example, as an oven, such as for example as a baking oven and/or as a cooker. An "oven" is intended to be understood to mean, in particular, a cooking appliance which has at least one muffle which at least partially delimits and/or defines at least one cooking chamber and which in an operating state supplies energy to at least one food, in particular for the purpose of heating and/or cooking the food, in particular in the cooking chamber. For example, the cooking appliance could be configured as a microwave appliance and/or as a grill appliance and/or as a steam cooker. Advantageously, the cooking appliance could be configured as a hob. The cooking appliance is configured, in particular, as an induction cooking appliance.

In particular, in an operating state the further functional unit executes at least one appliance main function. In particular, the further functional unit is part of an electrical appliance and in an operating state executes, in particular, an appliance main function of the electrical appliance. For example, in an operating state the further functional unit could execute at least one refrigerating function and/or at least one freezing function and/or at least one processing function and/or at least one scaling function and/or at least one cleaning function and/or at least one drying function. For example, in an operating state the further functional unit could process and, in particular, comminute and/or chop and/or stir and/or knead and/or blend and/or mix and/or cut up at least one food by means of the processing function.

The food preparation system has, in particular, at least one electrical appliance and advantageously at least the electrical appliance. The electrical appliance could be, for example, a mobile device and/or a household appliance, in particular a refrigeration appliance and/or a scaling appliance and/or a processing appliance. The scaling appliance could be, in particular, weighing scales, in particular kitchen scales. The processing appliance could, in particular, be a kneading machine and/or a dough machine and/or a mixer and/or a mixing machine.

The food preparation system differs, in particular, from a cookbook which is stored on a data carrier and/or which is able to be played back in at least one playback appliance, such as for example a DVD player. During the guidance through the recipe, the control unit in particular executes actions and/or handling operations which go beyond a simple playback of stored data and calculates, in particular actively, at least one further action and/or at least one further handling operation. In an operating state, the control unit is designed, in particular, to react to at least one user input and/or to change at least one process and/or at least one process step of the process, in particular as a function of at least one user input. "To change" is intended to be understood to mean, in particular, to edit and/or modify and/or alter and/or delete and/or skip and/or add.

An "output unit" is intended to be understood to mean, in particular, a unit which is designed to provide a user with at least one parameter, in particular optically and/or acoustically and/or haptically. The provided parameter could be, for example, information and/or a time specification and/or a user request and/or a handling request and/or a selection. The output unit could be designed, in particular, to output at least one acoustic signal and/or in particular at least one acoustic sequence, such as for example a ring tone and/or a warning signal and/or a request in the form of a pre-produced sentence. Alternatively or additionally, the output unit could be designed to provide at least one optical output, such as for example a display of at least one image and/or at least one text and/or at least one number and/or at least one animation. For example, the output unit could have at least one loudspeaker. Alternatively or additionally, the output unit could have a display unit, in particular with at least one lighting means, advantageously an LED, and/or in particular a back-lit display, in particular a matrix display and/or an LCD display, an OLED display and/or an electronic paper. Advantageously, the output unit could have at least one liquid crystal display.

By a combination of the output unit, which in particular has at least one liquid crystal display, and a guidance through the process and in particular a connection of the cooking appliance to the household appliance, in particular the strengths of a product, in particular of the cooking appliance and/or the household appliance, may be exploited, whereby in particular a high level of brand loyalty and/or product loyalty of a user could be achieved.

The food preparation system has, in particular, at least one user interface, which is designed in particular for an input and/or output of operating parameters. The user interface and the output unit are configured, in particular, at least partially integrally and advantageously integrally. Advantageously, the user interface comprises the output unit. "Integrally" is intended to be understood to mean, in particular, at least connected by a material connection, for example by a welding process, an adhesive bonding process, an injection-molding process and/or a further process which appears expedient to the person skilled in the art and/or advantageously formed in one piece, such as for example by a production from a cast and/or by a production in a single-component or multi-component injection-molding method and advantageously from a single blank.

A "control unit" is intended to be understood to mean, in particular, an electronic unit which is preferably designed to control and/or regulate at least the output unit and/or the user interface. The control unit could be at least partially integrated, for example, in a control and/or regulating unit of at least one cooking appliance and advantageously of a hob and could be designed, in particular, to control and/or regulate at least one functional unit of the cooking appliance, which could be designed, in particular, for carrying out a cooking appliance main function, in particular of the cooking appliance. In particular, the control unit has a computing unit and in particular in addition to the computing unit at least one memory unit with a control and/or regulating program which is stored therein and which is designed to be executed by the computing unit.

A "process" is intended to be understood to mean, in particular, a chronological sequence of settings and/or actions and/or computing operations, in particular for achieving at least one defined result. The settings could comprise, for example, heat settings and/or other operating settings and/or handling requests and/or process steps. For example, the actions could be executed and/or at least initiated by the control unit. The control unit could be designed, in particular, to execute and/or at least to initiate at least one action and/or at least one computing operation, in particular in order to achieve the defined result. For example, the result could be predefined and, in particular, stored in the memory unit of the control unit. For example, the result could be predetermined, in particular alternatively or additionally, by at least one user input, in particular by means of the user interface. In an operating state, the control unit could output, in particular, at least one user request and execute and/or at least initiate at least one action and/or at least one computing operation, in particular as a function of at least one user input, in particular by means of the user interface.

The expression that the control unit "at least initiates" an action is intended to be understood to mean, in particular, that the control unit executes the action itself and/or that the control unit initiates the action. The expression that the control unit "initiates" an action is intended to be understood to mean, in particular, that the control unit activates at least one further unit which executes the action as a function of the activation by the control unit.

In particular, the process could have at least two, in particular at least three, advantageously at least four, particularly advantageously at least five, preferably at least six and particularly preferably a plurality of process steps. For example, in particular at least two, advantageously at least three, particularly advantageously at least five, preferably at least eight and particularly preferably a plurality of different processes could be stored in the memory unit of the control unit.

The process could comprise, for example, at least one provision of information and/or at least one information search and/or at least one preparing process, in particular a food preparing process, and/or at least one processing process, in particular at least one food processing process and/or at least one preparation process, in particular at least one food preparation process, and/or be configured as such. Particularly advantageously, the process could comprise a recipe and could be configured, in particular, as a recipe.

A "process step" is intended to be understood to mean, in particular, a subsection of a process which has, in particular, a defined time duration and, in particular, a defined method step. The method step could comprise, for example, at least one heating step and/or at least one step with an interaction via the output unit and/or at least one step with an interaction via the user interface. For example, the method step could comprise at least one processing of at least one food and/or at least one preparing of at least one food. The time duration of the process step could be fixedly predetermined and/or variable, for example. For example, the time duration of the process step could be dependent on a time duration which is required for a user input, in particular by means of the user interface.

For example, the process step could comprise at least one information step and/or at least one comparison step and/or at least one analysis step and/or at least one instruction step and/or at least one research step and, in particular, be configured as such. The process step which is configured, in particular, as a recipe step could comprise for example, alternatively or additionally, in particular at least one heating step and/or at least one cooking step and/or at least one food preparing step and/or at least one food addition step and/or at least one food removal step and/or be configured as such.

In an operating state, the control unit guides in particular through at least one, in particular selected, process, and namely in particular as a function of a selection of the process by at least one user input, in particular by means of the user interface. The expression that the control unit is designed to "guide" through at least one process step of at least one process is intended to be understood to mean, in particular, that in an operating state the control unit requests at least one handling operation and/or outputs at least one piece of information, in particular by means of at least one output via the output unit and/or via the user interface, and/or that in an operating state the control unit automatically undertakes and/or initiates process steps required for carrying out the process. "Automatically" is intended to be understood to mean, in particular, by itself and/or avoiding an interaction by means of the user interface and/or avoiding a handling operation of a user.

The expression that the control unit is designed "during the guidance through the process" at least to initiate a machine-user interaction which is independent of the guidance through the process, is intended to be understood to mean in particular that the control unit is designed at least to initiate a machine-user interaction which is independent of the guidance through the process, at least in some sections simultaneously with the guidance through the process. In particular, in an operating state the control unit at least initiates a machine-user interaction which is independent of the guidance through the process, at least in some sections simultaneously with the guidance through the process. In an operating state, the control unit could at least start the initiation of the machine-user interaction which is independent of the guidance through the process, in particular simultaneously with the guidance through the process, and, for example, the machine-user interaction could be terminated after completion of the guidance through the process or chronologically during the guidance through the process. The guidance through the process and the initiation of the machine-user interaction and/or the machine-user interaction chronologically overlap, in particular at least in some sections.

A "machine-user interaction" is intended to be understood to mean, in particular, an action in which the control unit communicates with at least one user, in particular via the output unit and/or via the user interface, and/or in which the control unit receives in particular at least one piece of information, in particular for a communication with at least one user, in particular via the output unit and/or via the user interface and/or in which the control unit receives at least one user input, in particular by means of the user interface, and advantageously at least initiates at least one action as a function of the user input.

The machine-user interaction differs, in particular, from a simple output, for example in the form of brief information, of at least one further process step which is different from the process step, such as for example a further process step, which is configured as a future process step and/or as a past process step.

The machine-user interaction and the process are independent of one another in terms of content and/or do not overlap in terms of content. In particular, the machine-user interaction and the process are able to be executed separately from one another and advantageously in any chronological relation to one another and/or in any chronological sequence relative to one another and namely advantageously while achieving the same and/or identical results.

"Designed" is intended to be understood to mean, in particular, specially programmed, configured and/or equipped. An object being designed for a specific function is intended to be understood to mean, in particular, that the object fulfills and/or executes this specific function in at least one use state and/or operating state.

The process could be configured, for example, as a process which is different from a recipe and, in particular, comprise the process step which could be configured as a process step which is different from a recipe step. Preferably, the process is configured as a recipe and comprises the process step which is configured as a recipe step. A "recipe" is intended to be understood to mean, in particular, a chronological sequence of heating settings and/or other operating settings and/or handling requests and/or recipe steps for a preparation of at least one food. The heating settings could comprise, for example, at least one heating duration and/or at least one heating power and/or at least one heating temperature and/or at least one heating type, such as for example frying and/or boiling and/or steaming and/or simmering and/or melting and/or pressure cooking, in particular in a pressure cooker, and/or deep-frying and/or sautéing and/or poaching and/or baking and/or grilling. The operating settings could comprise, for example, at least one time duration which defines a total duration of the recipe, for example, and/or at least one chronological sequence of recipe steps and/or at least one type of output via the output unit, such as for example optically and/or acoustically. The recipe could be configured, in particular, as a recipe and/or as a cooking recipe and/or as a food preparation recipe. As a result, in particular, a convenient and/or simple and/or foolproof guidance may be provided through the process which is configured as a recipe, whereby a user is able to achieve success in a simple manner, even with complex and/or complicated recipes.

It is further proposed that the machine-user interaction comprises at least one further process step of at least one further process which is configured as a recipe and comprises the further process step which is configured as a further recipe step. In particular, the control unit is designed to initiate and advantageously execute the further process, in particular at least the further process step of the further process, of the machine-user interaction, at least in some sections simultaneously with the guidance through the process and/or during the guidance through the process. In an operating state, the control unit in particular at least initiates the further process, in particular at least the further process step of the further process, of the machine-user interaction, and advantageously executes the further process, in particular at least the further process step of the further process, of the machine-user interaction at least in some sections simultaneously with the guidance through the process and/or during the guidance through the process. The control unit is designed in particular to guide through at least one further process step which is configured as the further recipe step, at least in some sections simultaneously with the process step. In an operating state, the control unit guides through at least one further process step which is configured as the further recipe step, at least in some sections simultaneously with the process step. As a result, in particular a high level of ease of use may be achieved. Advantageously, a time-saving embodiment may be achieved and namely, in particular, compared to a guidance through a process in which the guidance through all of the process steps of the process takes place chronologically in succession. In particular, a user may be provided with a preparation of two different processes, which in particular is at least in some sections simultaneous, whereby for example in the case of large celebrations, such as for example family celebrations, a rapid and/or simple preparation of different recipes may be possible.

It is further proposed that the machine-user interaction comprises at least one process which is different from a recipe. The process which is different from a recipe could comprise, for example, a cooking process and could be configured, in particular, as a cooking process. In particular, the process which is different from a recipe could comprise in particular exactly one, advantageously a single, cooking step and in particular be configured as, in particular exactly one, advantageously a single, cooking step. As a result, in particular, a high level of ease of use and/or a high level of flexibility may be provided, since in particular a large number of options for selecting processes may be available to a user.

For example, the machine-user interaction could be specially designed and/or configured from guidance through processes, in particular of any type. Preferably, the machine-user interaction comprises at least one provision of at least one piece of information which is provided by at least one external unit. In particular, the food preparation system has at least one and advantageously at least the external unit. The external unit differs, in particular, from the cooking appliance and advantageously from the hob. For example, the external unit could have at least one mobile device, such as for example at least one laptop and/or at least one mobile telephone and/or at least one smartphone and/or at least one tablet. The external unit could have, for example, at least one data base and/or at least one network and/or at least one connection to at least one network. The network could be, for example, a household network and/or a regional network and/or a global network and/or at least one application. For example, the external unit could have at least one computer. The control unit and the external unit are designed, in particular, for a communication which is, in particular, wireless and/or wired. In an operating state, the control unit could receive, in particular, the information provided by the external unit. For example, alternatively or additionally, in an operating state the control unit could recall, for example, from the external unit the information provided by the external unit and/or request and/or activate the external unit for the provision of information. As a result, a high level of information may be available, in particular during the guidance through the process by means of the information, a user being able to be provided thereby, in particular, with additional information for the process through which the control unit simultaneously guides.

It is further proposed that the machine-user interaction and the process are designed for execution on the same household appliance, in particular on the same cooking appliance and advantageously on the same hob. In particular, the control unit is designed to execute the machine-user interaction and the process on the same household appliance, in particular on the same cooking appliance and advantageously on the same hob. In an operating state, the control unit guides the machine-user interaction and the process, in particular on the same household appliance, in particular on the same cooking appliance and advantageously on the same hob. The food preparation system has, in particular, at least one and advantageously at least the household appliance, which is advantageously configured as the cooking appliance and particularly advantageously as the hob. In particular, the household appliance, on which the control unit executes the machine-user interaction, and the household appliance, on which the control unit executes the process, are identical. As a result, in particular, further household appliances may be dispensed with, whereby in particular an embodiment which is cost-effective and/or which has a reduced number of components may be achieved.

It is further proposed that the machine-user interaction and the process are designed for execution on different household appliances. In particular, the control unit is designed to execute the machine-user interaction and the process on different household appliances. In an operating state, the control unit guides the process, in particular, on a household appliance and guides the machine-user interaction on a further household appliance which is different from the household appliance. The household appliance advantageously is the cooking appliance and particularly advantageously the hob. For example, the further household appliance could be a refrigeration appliance and/or a cleaning appliance and/or a small kitchen appliance and/or a processing appliance, in particular a food processing appliance. The food preparation system has in particular at least one further, and advantageously at least the further, household appliance. As a result, in particular, a high level of ease of use and/or a high level of flexibility may be achieved.

It is further proposed that the food preparation system has at least one and advantageously at least the user interface which is designed at least to initiate the machine-user interaction. In particular, in an operating state the control unit at least initiates the machine-user interaction via the user interface. In an operating state, the control unit executes the machine-user interaction via the user interface. As a result, in particular, a convenient initiation of the machine-user interaction may be achieved.

In an operating state, the control unit could provide an output of the machine-user interaction and an output of the process step via user interfaces which are different from one another, in particular via the user interface and via at least one further user interface which is different from the user interface. For example, in an operating state the control unit could provide an output of the machine-user interaction and an output of the process step chronologically in turn and/or chronologically alternately and/or chronologically spaced apart from one another via the user interface. Preferably, the control unit is designed to provide an output of the process step and an output of the machine-user interaction at least in some sections simultaneously via the user interface. In an operating state, the control unit provides an output of the process step and an output of the machine-user interaction at least in some sections simultaneously via the user interface. The expression that in an operating state the control unit provides an output of the process step and an output of the machine-user interaction, "at least in some sections simultaneously" via the user interface is intended to be understood to mean, in particular, that in an operating state the control unit provides in at least one time interval the output of the process step and the output of the machine-user interaction simultaneously via the user interface and, for example in at least one further time interval which is different from the time interval, could provide the output of the process step and the output of the machine-user interaction chronologically separate from one another via the user interface. As a result, in particular, a particularly clear output may be achieved, in which in particular a high level of clarity and/or a simultaneous viewing both of the process step and the machine-user interaction may be possible.

It is further proposed that the control unit is designed to mark and/or highlight the process step and the machine-user interaction differently in the output, which at least in some sections is simultaneous, as a function of at least one activity parameter. In an operating state, the control unit in particular could mark and/or highlight the process step and the machine-user interaction differently in the output, which at least in some sections is simultaneous, as a function of at least one activity parameter. Particularly advantageously, in an operating state the control unit could mark and/or highlight the process step and the machine-user interaction differently in the output, which at least in some sections is simultaneous, as a function of an activity of a user. The activity parameter could comprise, for example, an activity of a user and could be configured, in particular, as an activity of a user. For example, the activity parameter could comprise at least one active procedure in which a user is active currently and/or presently and/or at a given time. In an operating state, the control unit could highlight and/or mark in particular that procedure, in particular the process step and/or the machine-user interaction, in which a user is active currently and/or presently and/or at a given time. As a result, in particular, activities of a user may be detailed in the output, which at least in some sections is simultaneous, whereby in particular an optimally adapted and/or individual output may be provided.

The user interface could have, for example, at least two output units, in particular the output unit and at least one further output unit which is different from the output unit and which could be designed, in particular, in each case for an output, in particular, to a user. In an operating state, the control unit could provide, in particular, the output of the process step and the output of the machine-user interaction at least in some sections simultaneously via the output units of the user interface. In an operating state, the control unit could provide, in particular, the output of the process step via the output unit of the user interface and the output of the machine-user interaction via the further output unit of the user interface, at least in some sections simultaneously. Preferably, the user interface for the output, which is at least in some sections simultaneous, has at least one, and advantageously exactly one, display via which the control unit provides, in particular, an output of the process step and an output of the machine-user interaction, at least in some sections simultaneously. In particular, the display is part of the output unit. In an operating state, the control unit provides, in particular, an output of the process step and an output of the machine-user interaction, at least in some sections simultaneously via the output unit, in particular via the display of the output unit. As a result, in particular for the output, which is at least in some sections simultaneous, a further display may be dispensed with, whereby in particular an embodiment which is cost-effective and/or which has a reduced number of components may be achieved.

It is further proposed that the user interface has at least one operating element which is configured, in particular, as a rapid changeover switch and which has, in particular, at least one rapid changeover function. The operating element is designed, in particular, to change between the output of the process step and the output of the machine-user interaction. For example, the operating element could also be designed to change, in particular, between the output of the process step and/or the output of the machine-user interaction and/or at least one output of at least one initial menu and/or at least one output of at least one start menu and/or at least one output of at least one settings menu. In an operating state, the control unit in particular changes, in particular reversibly, between the output of the process step and the output of the machine-user interaction, in particular as a function of an actuation of the operating element. For example, the operating element could be designed to change between a main menu of the process and a main menu of the machine-user interaction. Alternatively or additionally, the operating element could be designed, in particular, to change between a submenu of the process and a submenu of the machine-user interaction, for example. "Change between" a first view and a second view is intended to be understood to mean, in particular, a change from the first view to the second view and/or a change from the second view to the first view. As a result, in particular, a particularly high level of ease of use and/or rapid change between the output of the process step and the output of the machine-user interaction may be achieved, whereby a particularly rapid reaction may be achieved, in particular, to critical and/or spontaneously occurring events, for example.

For example, in an operating state, the control unit could display the operating element independently of a menu type displayed, in particular always in the same manner, whereby for example a high identification value and/or a high recognition value could be achieved. Preferably, the control unit is designed to display the operating element differently as a function of at least one menu type displayed. In an operating state, the control unit displays, in particular, the operating element differently as a function of at least one menu type displayed. The menu type could comprise, for example, at least one process type and/or could be configured as a process type. For example, the menu type, comprising in particular the process type and/or configured as a process type, could comprise the process and/or the machine-user interaction. Advantageously, the menu type comprises menus which are different from one another and which, in particular, have different functions from one another and/or which are assigned processes and/or process types which are different from one another. For example, the control unit could display the control symbol, as a function of the menu type displayed, with different symbols and/or at different points of the output unit and/or in different colors and/or with different brightness and/or with different marking and/or with different contrast. In particular, in an operating state the control unit displays the operating element in a manner which is characteristic for a respective menu type. As a result, a respective menu type, in particular, may be recognized and/or identified and/or assigned particularly easily, whereby in particular an intuitive and/or rapid usability may be permitted.

It is further proposed that the user interface has at least one further operating element which in a selected process is designed to select at least one subfunction of the process. For example, the operating element and the further operating element could be configured integrally and/or identically. Particularly advantageously, the operating element and the further operating element are configured differently and/or separately from one another and/or respectively individually. In an operating state, the control unit selects, in particular in a selected process, at least one subfunction of the process, as a function of an actuation of the further operating element. In particular, in an operating state the control unit displays the further operating element, in particular exclusively, in particular in the selected process and advantageously in a main menu of the selected process. As a result, in particular, a clear assignment of the operating elements may be provided, wherein in particular a low risk of confusion may be achieved.

It is further proposed that the food preparation system has at least one cooking appliance and at least one hob, in which at least the control unit is at least partially integrated, in particular is integrated at least to a large part and advantageously is integrated. The expression that a first object is "at least partially" integrated in at least one second object is intended to be understood to mean, in particular, that the first object has at least one partial object which is integrated in the second object, and for example could have at least one further partial object which could be arranged outside the second object and/or which could be integrated in at least one third object which is different from the second object. "At least to a large part" is intended to be understood to mean, in particular, a proportion, in particular a mass proportion and/or a volume proportion of at least 70%, in particular of at least 80%, advantageously of at least 90% and preferably of at least 95%. As a result, in particular, a reduced stock-keeping and/or a small variety of components may be achieved.

A particularly high level of ease of use may be achieved, in particular, by a cooking appliance, in particular by a hob of a food preparation system according to the invention.

An ease of use may be further increased, in particular, by a method for an operation of a food preparation system according to the invention, wherein guidance takes place through at least one process step of at least one process, in particular via at least one output unit of the food preparation system, wherein during the guidance through the process a machine-user interaction which is independent of the guidance through the process is at least initiated, in particular via the output unit.

In this case, the food preparation system is not intended to be limited to the above-described use and embodiment. In particular, the food preparation system may have a number of individual elements, components and units which is different from a number mentioned herein in order to fulfill a mode of operation described herein.

Further advantages emerge from the following description of the drawing. Exemplary embodiments of the invention are shown in the drawing. The drawing, the description and the claims contain numerous features in combination. The person skilled in the art will also expediently consider the features individually and combine them to form further meaningful combinations.

DETAILED DESCRIPTION OF EXEMPLARY EMBODIMENTS OF THE PRESENT INVENTION

Figure 1:
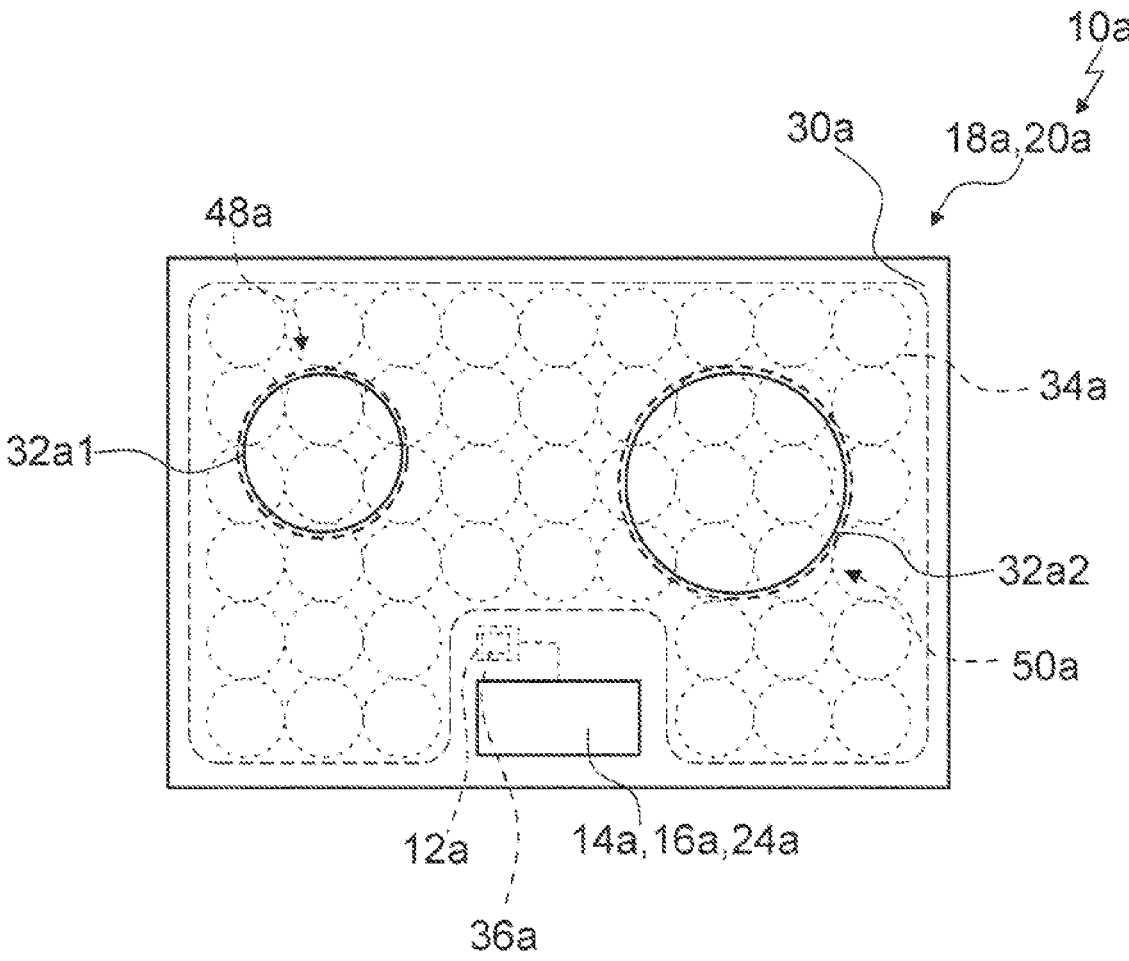
FIG. 1 shows a food preparation system, in a schematic plan view.

FIG. 1 shows by way of example a food preparation system 10a. The food preparation system 10a could be configured, for example, as a cooking system and, in particular, as an induction cooking system. For example, the food preparation system 10a could be configured as a hob-type cooking system and, in particular, as an induction hob-type cooking system.

The food preparation system 10a has, in particular, at least one and advantageously exactly one cooking appliance 18a. The cooking appliance 18a could be, for example, at least one oven, such as for example a cooker and/or a baking oven. In particular, alternatively or additionally, the cooking appliance 18a could be, for example, a microwave appliance and/or a grill appliance and/or a steam cooker. Advantageously, the cooking appliance 18a in the present exemplary embodiment is a hob. The cooking appliance 18a is, in particular, an induction cooking appliance. In particular, in the present exemplary embodiment the cooking appliance 18a is an induction hob.

In particular, the cooking appliance 18a is suitable specifically for the food preparation system 10a and, in particular, adapted specifically to the food preparation system 10a. The cooking appliance 18a is designed, in particular, specifically for the food preparation system 10a.

The cooking appliance 18a has, in particular, at least one and advantageously exactly one appliance plate 30a. The appliance plate 30a is configured, in particular, as a positioning plate and advantageously as a hob plate. In a mounted state, the appliance plate 30a forms, in particular, a part of the appliance external housing, in particular a hob external housing, advantageously of the cooking appliance 18a. The appliance plate 30a is designed, in particular, for positioning an item of cookware 32a.

The food preparation system 10a has, in particular, at least one heating unit 34a. Advantageously, the food preparation system 10a has at least two, in particular at least four, advantageously at least eight, particularly advantageously at least twelve, preferably at least fifteen and particularly preferably a plurality of heating units 34a. In the present exemplary embodiment, by way of example the food preparation system 10a has forty-eight heating units 34a. Of the objects which are repeatedly present, in each case only one is provided with a reference character in the figures.

For example, alternatively, the food preparation system 10a could have, in particular, a smaller number of heating units 34a. For example, the food preparation system 10a could have two, in particular three, advantageously four, particularly advantageously five and preferably six heating units 34a.

For example, the heating units 34a could be arranged in the form of a conventional hob, in which at least some of the heating units 34a, in particular, could form separate heating zones. Advantageously, at least some of the heating units 34a could be arranged in the form of a matrix and, in particular, combined to form a flexible definition and/or formation of heating zones, in particular by at least one control unit 12*a*. Hereinafter, only one of the heating units 34*a* is described by way of example.

In particular, the heating unit 34*a* is arranged in an installed position on a side of the appliance plate 30*a* facing away from a user. In particular, the heating unit 34*a* is arranged in an installed position below the appliance plate 30*a*. In a mounted state, the heating unit 34*a* is integrated, in particular at least partially and advantageously at least to a large part, in the cooking appliance 18*a*, in particular in the hob. The heating unit 34*a* is designed, in particular, to heat an item of cookware 32*a* positioned on the appliance plate 30*a* above the heating unit 34*a*. The heating unit 34*a* is, in particular, part of the cooking appliance 18*a*, in particular part of the hob. The cooking appliance 18*a*, in particular the hob, has in particular the heating unit 34*a*.

The food preparation system 10*a* has, in particular, at least one and advantageously exactly one user interface 14*a*. The user interface 14*a* is designed, in particular, for an input and/or selection of operating parameters, such as for example a heating power and/or a heating power density and/or a heating zone. The user interface 14*a* is designed, in particular, for an output of a value of an operating parameter to a user. In a mounted state, the user interface 14*a* is integrated, in particular at least partially and advantageously at least to a large part, in the cooking appliance 18*a*, in particular in the hob. The cooking appliance 18*a*, in particular the hob, has in particular the user interface 14*a*.

The food preparation system 10*a* has, in particular, at least one and advantageously exactly one output unit 16*a*. The output unit 16*a* is configured, in particular, at least partially integrally with the user interface 14*a*. In particular, the output unit 16*a* is part of the user interface 14*a*. The user interface 14*a* has, in particular, the output unit 16*a*.

The expression that a first object and a second object are configured "at least partially integrally" with one another is intended to be understood to mean, in particular, that the first object has at least one element which is also part of the second object and/or that the second object has at least one element which is also part of the first object. In particular, the user interface 14*a* and the output unit 16*a* in each case have at least one, in particular at least two, advantageously at least three, common elements which are a component, in particular a functionally important component, both of the user interface 14*a* and of the output unit 16*a*.

In particular, the output unit 16*a* is designed, in particular, for an optical output to a user. In particular, alternatively or additionally, the output unit 16*a* could be designed, for example, for an acoustic output to a user.

In a mounted state, the output unit 16*a* is integrated, in particular at least partially and advantageously at least to a large part, in the cooking appliance 18*a*, in particular in the hob. The output unit 16*a*, in particular, is part of the cooking appliance 18*a*, in particular of the hob. In particular, the cooking appliance 18*a*, in particular the hob, has the output unit 16*a*.

In particular, alternatively or additionally, the output unit 16*a* and/or the user interface 14*a*, for example, could be partially integrated in the cooking appliance 18*a* and, in particular, partially in at least one mobile device of the food preparation system 10*a*. The output unit 16*a* and/or the user interface 14*a* could be integrated, in particular alternatively or additionally, in particular at least partially advantageously at least to a large part and preferably entirely, in at least one mobile device of the food preparation system 10*a*.

The food preparation system 10*a* has, in particular, at least one and advantageously exactly one control unit, in particular at least the and advantageously exactly the control unit

12*a*. The control unit 12*a* is designed, in particular, to execute actions and/or to change settings as a function of operating parameters input by means of the user interface 14*a*. In a heating operating state, the control unit 12*a* regulates, in particular, an energy supply to the heating unit 34*a*. In a mounted state, in particular, the control unit 12*a* is integrated at least partially and advantageously at least to a large part in the cooking appliance 18*a*, in particular in the hob. The cooking appliance 18*a*, in particular the hob, has in particular the control unit 12*a*.

The control unit 12*a* is designed, in particular, to control and/or regulate at least the user interface 14*a* and/or the output unit 16*a*. In an operating state, the control unit 16*a* controls and/or regulates, in particular, the user interface 14*a* and/or the output unit 16*a*. Hereinafter, for example, only the user interface 14*a* is mentioned as representing the expression "user interface 14*a* and/or output unit 16*a*".

The control unit 12*a* is designed to guide through at least one process step 40*a* of at least one process 38*a*, in particular via the user interface 14*a* (see FIGS. 2 to 8). In an operating state, the control unit 12*a* guides, in particular via the user interface 14*a*, in particular through at least one process step 40*a* of at least one process 38*a*, and namely in particular as a function of a selection of the process by at least one user input.

The process 38*a* is particularly advantageously configured as a recipe. In particular, the process 38*a* comprises at least the process step 40*a*. The process 38*a* comprises, in particular, at least the process step 40*a* which is configured as the recipe step.

The control unit 12*a* has in particular at least one memory unit 36*a*. The process 38*a* is stored, in particular, in the memory unit 36*a*. Advantageously, a plurality of processes 38*a* are stored in the memory unit 36*a*, in particular with the process steps 40*a* belonging to the respective process 38*a*.

Particularly advantageously, the control unit 12*a* is designed during the guidance through the process 38*a*, in particular via the user interface 14*a*, at least to initiate a machine-user interaction 42*a* which is independent of the guidance through the process 38*a*. In an operating state, the control unit 12*a* during the guidance through the process 38*a*, in particular via the user interface 14*a*, at least initiates a machine-user interaction 42*a* which is independent of the guidance through the process 38*a*. In an operating state, the control unit 12*a* executes the guidance through the process 38*a* and the machine-user interaction 42*a* particularly advantageously at least in some sections simultaneously (see FIG. 2).

In the present exemplary embodiment, the machine-user interaction 42*a* comprises, in particular, at least one further process step 46*a* of at least one further process 44*a*, which is configured as a recipe and comprises the further process step 46*a* which is configured as a further recipe step. In particular, the machine-user interaction 42*a* comprises the further process 44*a*. In the present exemplary embodiment, the further process 44*a* in particular comprises at least two, advantageously at least three, particularly advantageously at least four, preferably at least five and particularly preferably a plurality of further process steps 46*a*.

The further process 44*a* is advantageously configured as a recipe. In particular, the further process step 46*a* is configured as a further recipe step. The further process 44*a* which is configured as a recipe comprises, in particular, the further process step 46*a* which is configured as the further recipe step.

Figure 2:
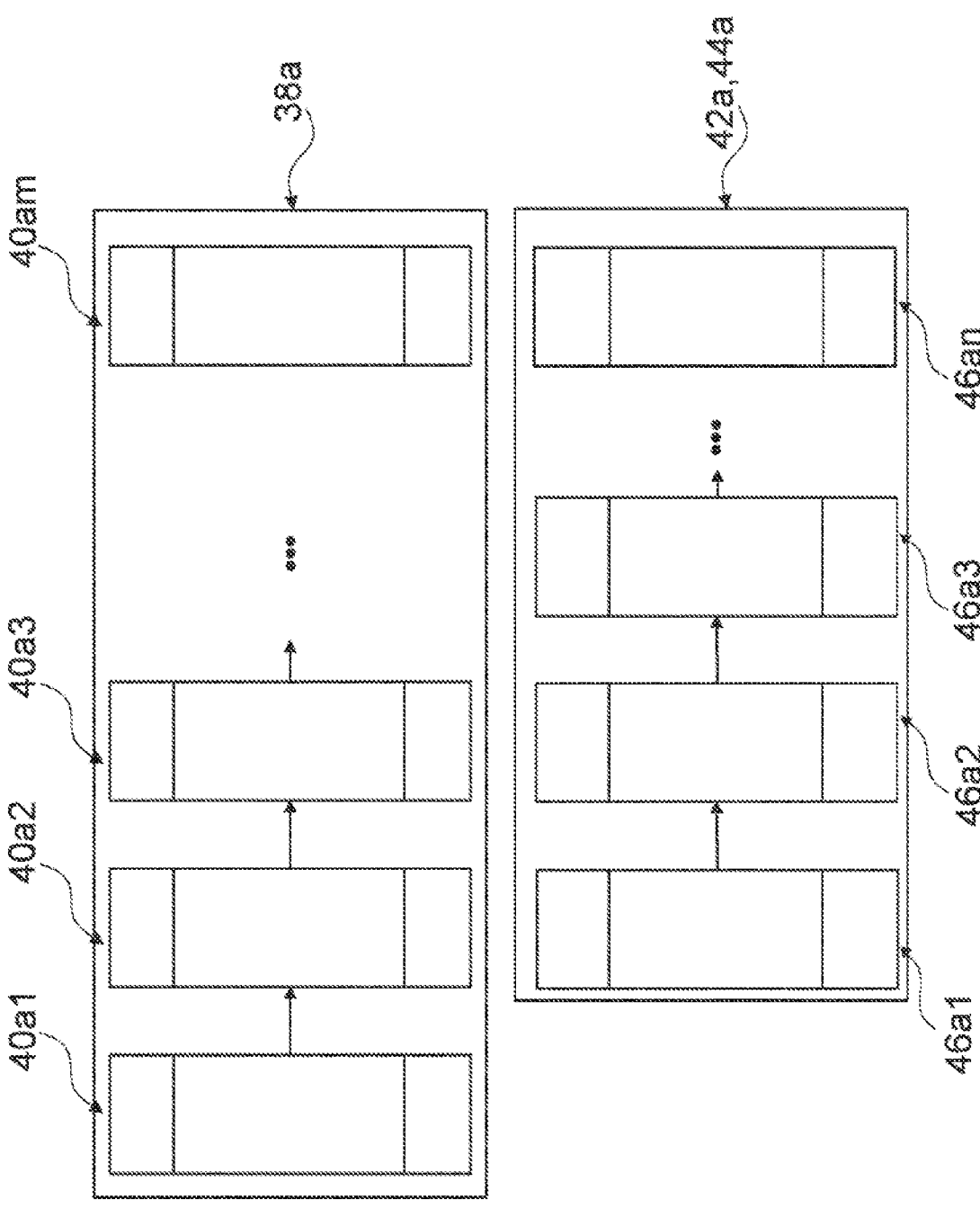
FIG. 2 shows a diagram in which an exemplary process and an exemplary machine-user interaction are shown, in a schematic view.

In FIG. 2, in particular, the reference characters assigned to the process step 40*a* of the process 38*a* are supplemented at the end thereof by numbers increasing from one. For example, the process step 40*a*3 denoted by the reference character 40*a*3 is a third process step 40*a*3 of the process 38*a*. In particular, in FIG. 2, the further process steps 46*a* of the further process 44*a* are denoted similarly. The letters "m" and "n" in particular in each case stand for a whole number greater than zero and in each case represent the last process step 40*a*, 46*a* of the corresponding process 38*a*, 44*a*.

The food preparation system 10*a* has, in particular, at least one and advantageously exactly one household appliance 20*a* (see FIG. 1). In the present exemplary embodiment, the household appliance 20*a* and the cooking appliance 18*a* are configured, in particular, integrally and/or identically. In particular, the household appliance 20*a* is configured as the cooking appliance 18*a*.

The control unit 12*a* executes the machine-user interaction 42*a* and the process 38*a*, in particular on the same household appliance 20*a* and/or on the same cooking appliance 18*a*. The machine-user interaction 42*a* and the process 38*a* are designed, in particular, for execution on the same household appliance 20*a*.

In particular, during the execution of the machine-user interaction 42*a* and the process 38*a*, which is at least in some sections simultaneous, the control unit 12*a* is designed in particular to execute the machine-user interaction 42*a* and the process 38*a* at least in some sections simultaneously in different zones 48*a*, 50*a* of the cooking appliance 18*a*. In an operating state, the control unit 12*a* executes the machine-user interaction 42*a* and the process 38*a* at least in some sections simultaneously in different zones 48*a*, 50*a* of the cooking appliance 18*a*.

In particular, the cooking appliance 18*a* has at least the zones 48*a*, 50*a*. The zones 48*a*, 50*a* are configured in particular as heating zones. The cooking appliance 18*a* has, in particular, a zone 48*a* of the zones 48*a*, 50*a* which is configured, in particular, as a heating zone. In particular, the control unit 12*a* is designed to heat at least one, in particular first, item of cookware 32*a*1 by means of the zone 48*a*. In an operating state, the control unit 12*a* heats, in particular, the first item of cookware 32*a*1 by means of the zone 48*a*.

The cooking appliance 18*a* has, in particular, a further zone 50*a* of the zones 48*a*, 50*a*, which is configured in particular as a heating zone. In particular, the control unit 12*a* is designed to heat at least one, in particular second, item of cookware 32*a*2 by means of the further zone 50*a*. In an operating state, the control unit 12*a* heats, in particular, the second item of cookware 32*a*2 by means of the further zone 50*a*.

One possible embodiment of the execution of the machine-user interaction 42*a* and the process 38*a*, which is at least in some sections simultaneous, is described hereinafter by way of example and namely in particular with reference to FIGS. 3 to 8. In this case, it is only an embodiment selected by way of example, which in particular is not to be considered as limiting.

The user interface 14*a* is designed, in particular, at least to initiate the machine-user interaction 42*a*. In particular, the user interface 14*a* is designed for at least one machine-user interaction 42*a* at least in combination with the execution of the machine-user interaction 42*a* and the process 38*a*, which is at least in some sections simultaneous. The user interface 14*a* is designed, in particular, for an output and/or input, at least in combination with the guidance through the process 38*a* and/or with the initiation of the machine-user interaction 42*a* and/or with the execution of the machine-user interaction 42*a*.

The control unit 12*a* is designed, in particular, to provide an output of the process step 40*a* and an output of the machine-user interaction 42*a* at least in some sections simultaneously via the user interface 14*a* (see FIGS. 4 to 8). In particular, in an operating state the control unit 12*a* provides an output of the process step 40*a* and an output of the machine-user interaction 42*a* at least in some sections simultaneously via the user interface 14*a*.

In particular, the user interface 14*a* has at least one display 24*a*. The display 24*a* is designed, in particular, at least for an output, in particular to at least one user. In an operating state, the control unit 12*a* provides, in particular, by means of the display 24*a* at least one output, in particular to at least one user.

The display 24*a* is designed, in particular, for the output, which is at least in some sections simultaneous. In an operating state, the control unit 12*a* provides, in particular, the output, which is at least in some sections simultaneous, via the display 24*a* of the user interface 14*a*. In particular, in an operating state the control unit 12*a* outputs the process step 40*a* and the machine-user interaction 42*a* at least in some sections simultaneously via the display 24*a*.

In the present exemplary embodiment, in an operating state the control unit 12*a* provides in particular in the output, which is at least in some sections simultaneous, an output of the machine-user interaction 42*a* in at least one, in particular first and/or left-hand, side region, in particular of the user interface 14*a* and/or of the display 24*a*. The control unit 12*a* provides in particular in the output, which is at least in some sections simultaneous, an output of the process step 40*a* in at least one, in particular second and/or right-hand, side region, in particular of the user interface 14*a* and/or of the display 24*a*.

Figures 3, 4:
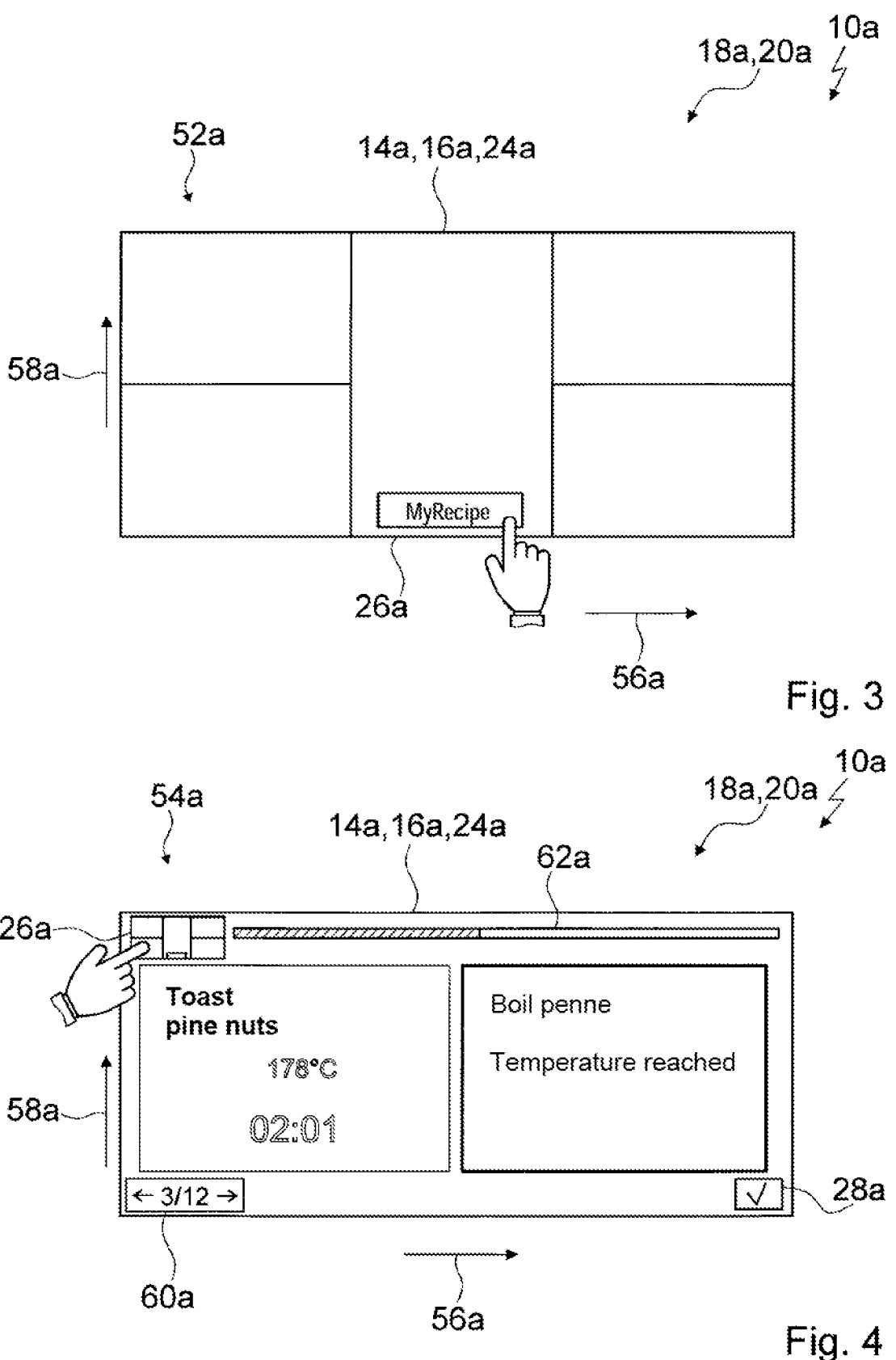
FIG. 3 shows a user interface of the food preparation system in an output mode, in a schematic view.
FIG. 4 shows the user interface in a further output mode, in a schematic view.

FIG. 3 shows, in particular, the user interface 14*a* following an activation of the cooking appliance 18*a*. In particular, following an activation of the cooking appliance 18*a* the control unit 12*a* provides at least one initial menu 52*a* and/or at least one start menu by means of the user interface 14*a*. In particular, the initial menu 52*a* and the start menu are configured integrally, which is why only the initial menu 52*a* is described hereinafter by way of example.

In the present exemplary embodiment, in particular, the initial menu 52*a* and at least one settings menu are configured integrally. In particular, the control unit 12*a* is designed to undertake and/or to change and/or to select at least one setting and/or at least one operating setting in the settings menu as a function of at least one user input, in particular by means of the user interface 14*a*. In an operating state, the control unit 12*a* could undertake and/or change and/or select at least one setting and/or at least one operating setting in the settings menu, in particular as a function of at least one user input, in particular by means of the user interface 14*a*.

For example, the operating setting could comprise at least one heating stage and/or at least one heating power and/or at least one heating setting and/or at least one temperature and/or at least one timer and/or at least one time duration and/or at least one time and/or at least one heating zone and/or at least one zone 48*a*, 50*a*.

The user interface 14*a* has, in particular, at least one and advantageously exactly one operating element 26*a*. The operating element 26*a* is designed, in particular, for an actuation, in particular by a user. In the present exemplary embodiment, the operating element 26*a* is configured as a touch-sensitive operating element. The user interface 14*a* is designed, in particular, for a touch-sensitive input.

The operating element 26*a* is configured, in particular, as a rapid changeover switch. In particular, the operating element 26*a* has a rapid changeover function. The operating element 26*a* is designed, in particular, for a rapid change, in particular between the initial menu 52*a* and at least one process menu 54*a* (see FIGS. 3 and 4). In an operating state, the control unit 12*a* changes between the initial menu 52*a* and the process menu 54*a*, in particular as a function of a user input, in particular by means of the user interface 14*a*. The process menu 54*a* is configured, in particular, as a main menu of the process 38*a*.

The control unit 12*a* provides the operating element 26*a*, in particular in the initial menu 52*a*, in the form of a rectangular-like and/or rectangular-shaped and/or rectangular symbol and labels the operating element 26*a*, in particular, with the word "MyRecipe". In particular, the control unit 12*a* displays the operating element 26*a* in the initial menu 52*a* on a lower edge, in particular of the initial menu 52*a* and/or of the display 24*a* and/or of the user interface 14*a*, and namely in particular relative to the transverse direction 56*a* at least substantially centrally and advantageously centrally.

The transverse direction 56*a* is oriented, in particular, perpendicularly to a depth direction 58*a*. The depth direction 58*a* extends, in particular, from a region of the user interface 14*a* facing a user into a region of the user interface 14*a* facing away from a user. In an installed position, the transverse direction 56*a* extends, in particular, from a first and/or left-hand side edge of the user interface 14*a* to a second and/or right-hand side edge of the user interface 14*a*.

In particular, the control unit 12*a* is designed to display the operating element 26*a* differently as a function of at least one menu type displayed. In particular, in an operating state the control unit 12*a* displays the operating element 26*a* differently as a function of at least one menu type shown.

In the process menu 54*a*, the control unit 12*a* displays the operating element 26*a*, in particular, in the form of a rectangular-like and/or rectangular-shaped and/or rectangular symbol and, in particular, omits a labelling of the operating element 26*a* and assigns to the operating element 26*a* an image in the form of the initial menu 52*a*. In particular, the control unit 12*a* displays the operating element 26*a* in the process menu 54*a* on an upper edge, in particular of the process menu 54*a* and/or of the display 24*a* and/or of the user interface 14*a*, and namely in particular relative to a transverse direction 56*a*, in particular in a first and/or left-hand side region.

In particular, in addition to the operating element 26*a* the user interface 14*a* has, in particular, at least one further operating element 28*a* (see FIGS. 4 to 8). The further operating element 28*a* is designed, in particular in a selected process 38*a*, to select at least one subfunction of the process 38*a*. In the present exemplary embodiment, the subfunction could comprise, for example, at least one process step 40*a* of the process 38*a*.

In particular, in the process menu 54*a* the control unit 12*a* displays the further operating element 28*a*, in particular in the form of a square-like and/or square-shaped and/or square symbol and, in particular, omits a labelling of the further operating element 28*a* and assigns to the further operating element 28*a* an image in the manner of a checkmark and/or in the shape of a checkmark. In particular, the control unit 12*a* displays the further operating element 28*a*, in particular in the process menu 54*a* on a lower edge, in particular of the process menu 54*a* and/or of the display 24*a* and/or of the user interface 14*a* and namely in particular relative to a transverse direction 56*a*, in particular in a second and/or right-hand side region.

The further operating element 28*a* is configured, in particular, as a selection element and/or as confirmation element. In particular, the further operating element 28*a* is designed for a selection and/or for a confirmation.

In an operating state, the control unit 12*a* could select and/or confirm at least one subfunction of the selected process 38*a*, in particular as a function of an actuation of the further operating element 28*a*. In particular, alternatively or additionally, in an operating state the control unit 12*a* could preselect the subfunction, in particular as a function of a selection of a symbol displayed on the user interface 14*a* and assigned to the subfunction, and could confirm the preselection, in particular, as a function of an actuation of the further operating element 28*a*.

The control unit 12*a* is designed, in particular, to mark and/or highlight the selected subfunction. In an operating state, the control unit 12*a* marks, in particular, the selected subfunction and/or highlights the selected subfunction.

In particular, the control unit 12*a* is designed to mark and/or highlight the process step 40*a* and the machine-user interaction 38*a* differently in the output, which at least in some sections is simultaneous, as a function of at least one activity parameter. In an operating state, the control unit 12*a* could mark and/or highlight, in particular, the process step 40*a* and the machine-user interaction 42*a* differently in the output, which at least in some sections is simultaneous, as a function of at least one activity parameter.

Figure 5:
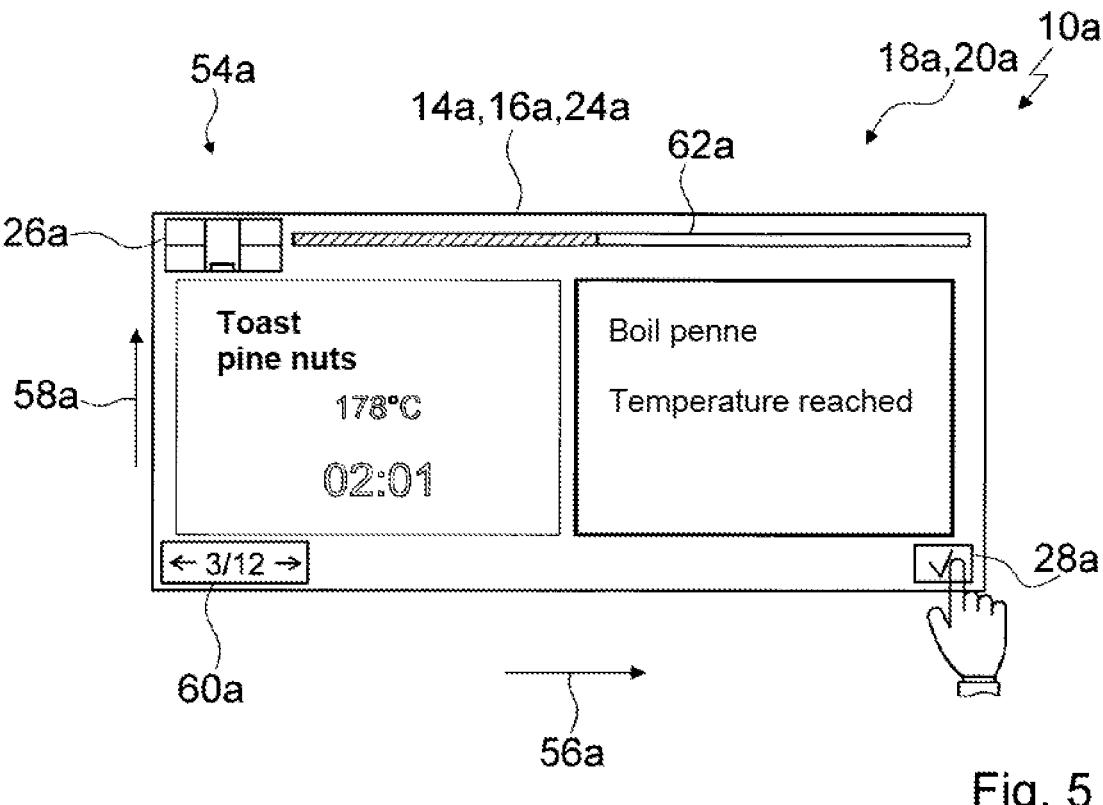
FIG. 5 shows the user interface in a further output mode, in a schematic view.

For example, the control unit 12*a* could mark and/or highlight and/or display the process 38*a* and/or the machine-user interaction 42*a*, for example, with high contrast and/or in strong colors in the output, which in at least some sections is simultaneous, of a selected procedure (see FIGS. 4 and 5 in each case in the right-hand half).

For example, the control unit 12*a* could display and/or grey out a further procedure, which is displayed at least in some sections simultaneously with a selected procedure, for example the machine-user interaction 42*a* and/or the process 38*a*, with low contrast and/or in bright colors in the output, which at least in some sections is simultaneous (see FIGS. 4 and 5 in each case in the left-hand half). For example, in an output of the further procedure, the control unit 12*a* could provide at least to a large part and advantageously all of the information which is assigned to the further procedure. Advantageously, the control unit 12*a* could limit an output of the further procedure to a view of essential information and/or omit a view of additional information.

The procedure and/or the further procedure could comprise, for example, the process 38*a* and/or the process step 40*a* and/or the machine-user interaction 42*a*.

In an operating state, the control unit 12*a* enables access to at least one operating setting of the selected procedure, in particular as a function of a selection of at least one procedure. In particular, in an operating state at least one operating setting of the selected procedure is enabled and/or available and/or accessible, as a function of a selection of at least one procedure.

The user interface 14*a* has, in particular, at least one and advantageously exactly one navigation control element 60*a*. The navigation control element 60*a* is designed, in particular, to select at least one subfunction of, in particular, the selected process 38*a* and/or procedure and/or to change between different subfunctions of, in particular, the selected process 38*a* and/or procedure.

In an operating state, the control unit 12*a* could select at least a subfunction of, in particular, the selected process 38*a* and/or procedure, in particular as a function of an actuation of the navigation control element 60*a*. In an operating state, the control unit 12*a* could change between different subfunctions of, in particular, the selected process 38*a* and/or procedure, in particular as a function of an actuation of the navigation control element 60*a*.

The user interface 14*a* has, in particular, at least one and advantageously exactly one progress output element 62*a*. The progress output element 62*a* is designed, in particular to output at least one progress of, in particular, the selected process 38*a* and/or, in particular, the selected procedure and/or, in particular, the selected process step 40*a*.

In an operating state, the control unit 12*a* could output and/or provide, in particular by means of the progress output element 62*a*, at least one progress of, in particular, the selected process 38*a* and/or, in particular, the selected procedure and/or, in particular, the selected process step 40*a*. The progress output element 62*a* is configured, in particular, as a progress bar.

Figure 6:
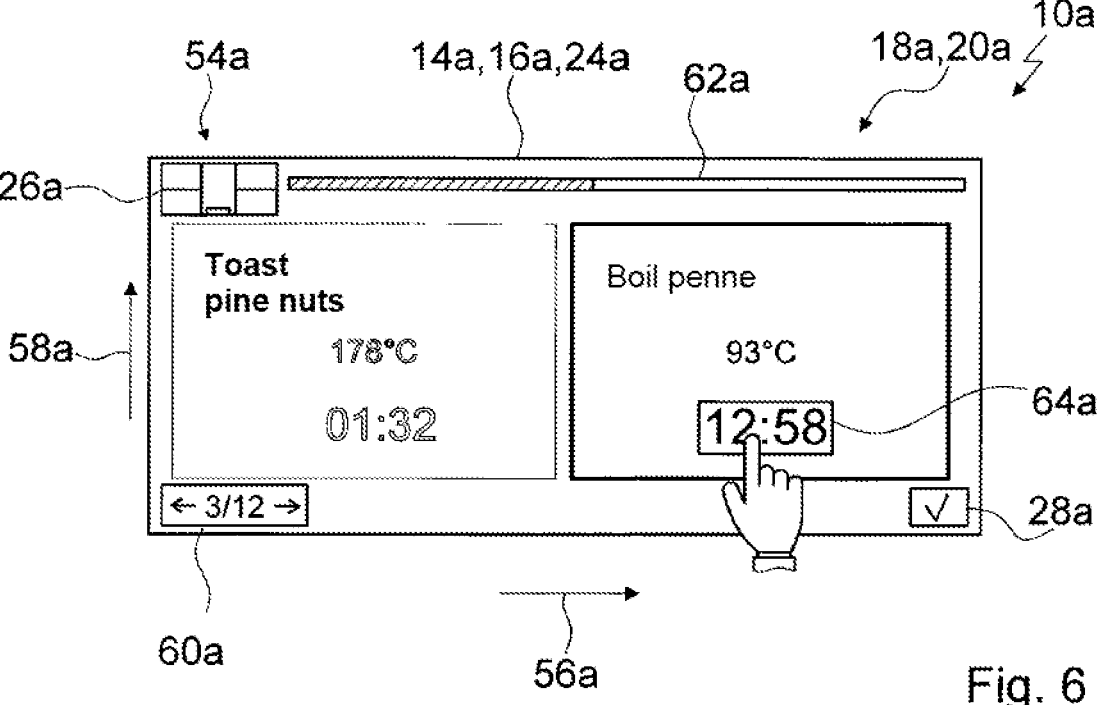
FIG. 6 shows the user interface in a further output mode, in a schematic view.

The user interface 14*a* has, in particular, at least one and advantageously exactly one rapid access element 64*a* (see FIG. 6). In particular, the rapid access element 64*a* is designed for rapid access to at least one subfunction of, in particular, the selected process 38*a* and/or, in particular, the selected procedure. In an operating state, the control unit 12*a* could change to at least one subfunction of, in particular, the selected process 38*a* and/or, in particular, the selected procedure, in particular as a function of an actuation of the rapid access element 64*a* and namely, in particular, avoiding an actuation of at least one element of the user interface 14*a* which is different from the rapid access element 64*a*.

In the present exemplary embodiment, the rapid access element 64*a* is designed for rapid access to at least one time function and/or to at least one timer function. In an operating state, the control unit 12*a* changes between the process menu 54*a* and at least one time setting menu 66*a*, in particular as a function of an actuation of the rapid access element 64*a* (see FIGS. 6 and 7). The control unit 12*a* is designed to change between the process menu 54*a* and the time setting menu 66*a*, in particular as a function of an actuation of the rapid access element 64*a*. The time setting menu 66*a* is designed, in particular, for setting and/or selecting at least one time and/or at least one time duration and/or at least one timer.

Figures 7, 8:
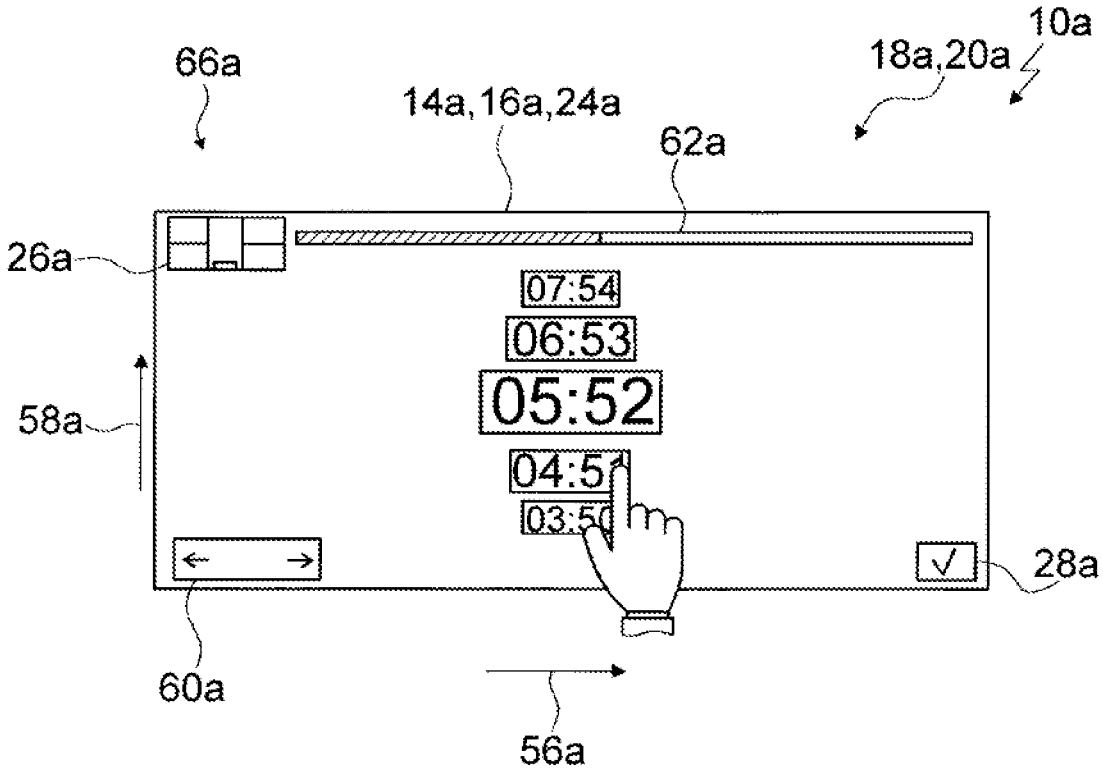
FIG. 7 shows the user interface in a further output mode, in a schematic view.
FIG. 8 shows the user interface in a further output mode, in a schematic view.

In particular, the control unit 12*a* is designed to change between the process menu 54*a* and at least one interaction menu 68*a*, as a function of an actuation of the operating element 26*a* (see FIGS. 4 and 8). In an operating state, the control unit 12*a* changes between the process menu 54*a* and the interaction menu 68*a*, in particular as a function of an actuation of the operating element 26*a*.

The interaction menu 68*a* is configured and/or embodied, in particular, in a similar manner to the process menu 54*a*. In particular, the interaction menu 68*a* and the process menu 54*a* differ by a highlighted and/or marked procedure. In the interaction menu 68*a*, the control unit 12*a* in particular marks the machine-user interaction 42*a* and/or highlights the machine-user interaction 42*a*. In particular in the process menu 54*a*, the control unit 12*a* in particular marks the process 38*a* and/or highlights the process 38*a*.

Figure 9:
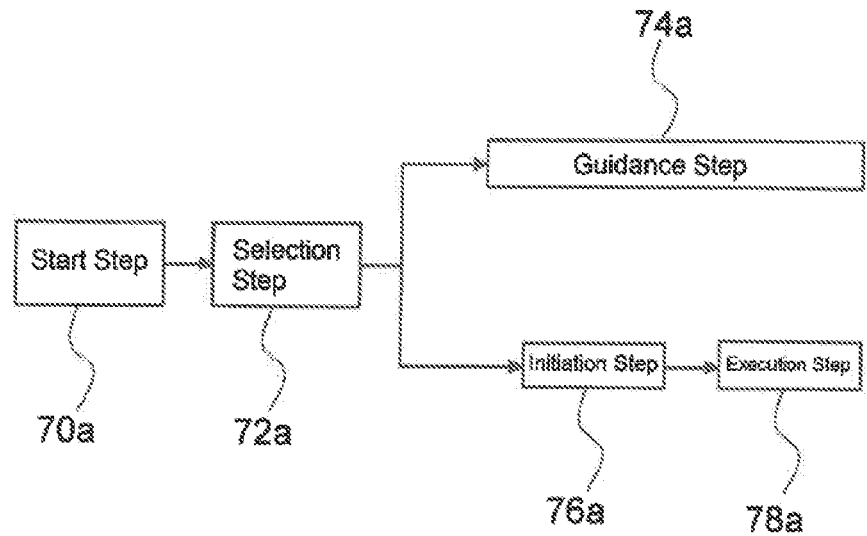
FIG. 9 shows a method for operating the food preparation system, in a schematic view.

In a method for an operation of the food preparation system 10*a*, in particular, the cooking appliance 18*a* is started and the initial menu 52*a* displayed, in particular, in at least one start step 70*a* (see FIGS. 3 and 9). In particular, the process 38*a* is selected for a guidance through the process 38*a*, in particular, in at least one selection step 72*a*.

In particular, guidance takes place through the process step 40*a* of the process 38*a* and/or through the process 38*a*, in particular, in at least one guidance step 74*a*. During the guidance through the process 38*a*, a machine-user interaction 42*a* which is independent of the guidance through the process 38*a* is at least initiated, in particular in at least one initiation step 76*a*. In particular, the machine-user interaction 42*a* is executed in at least one interaction execution step 78*a*, in particular at least in some sections simultaneously with the guidance through the process 38*a* and/or through the process step 40*a* of the process 38*a*.

Figure 10:
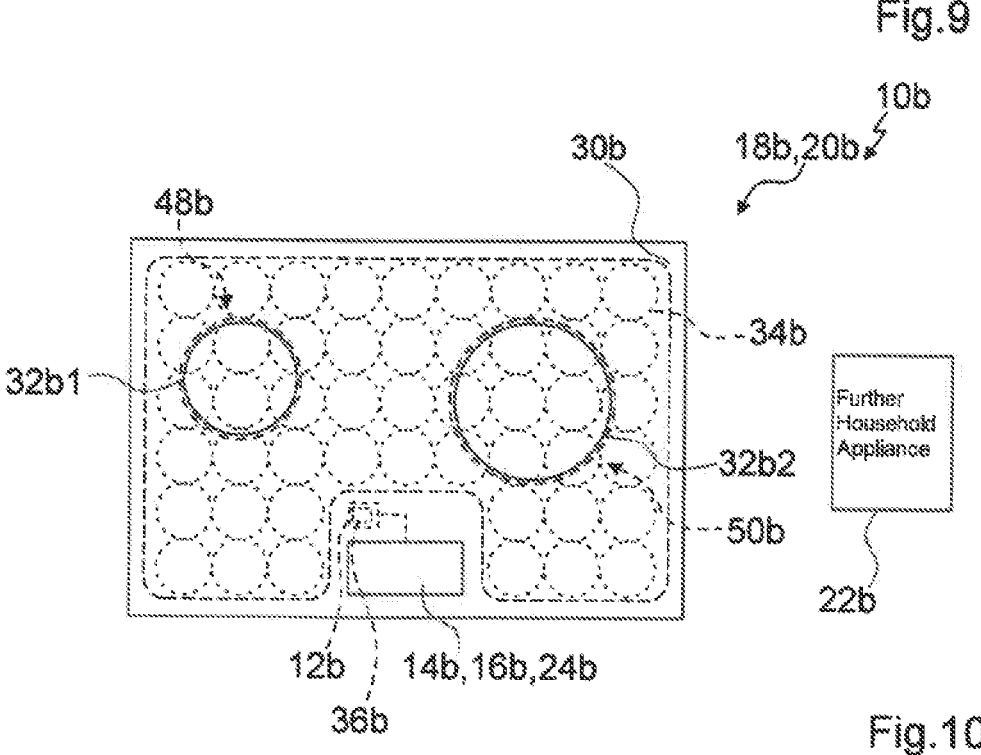
FIG. 10 shows an alternative food preparation system, in a schematic plan view.
Figure 12:
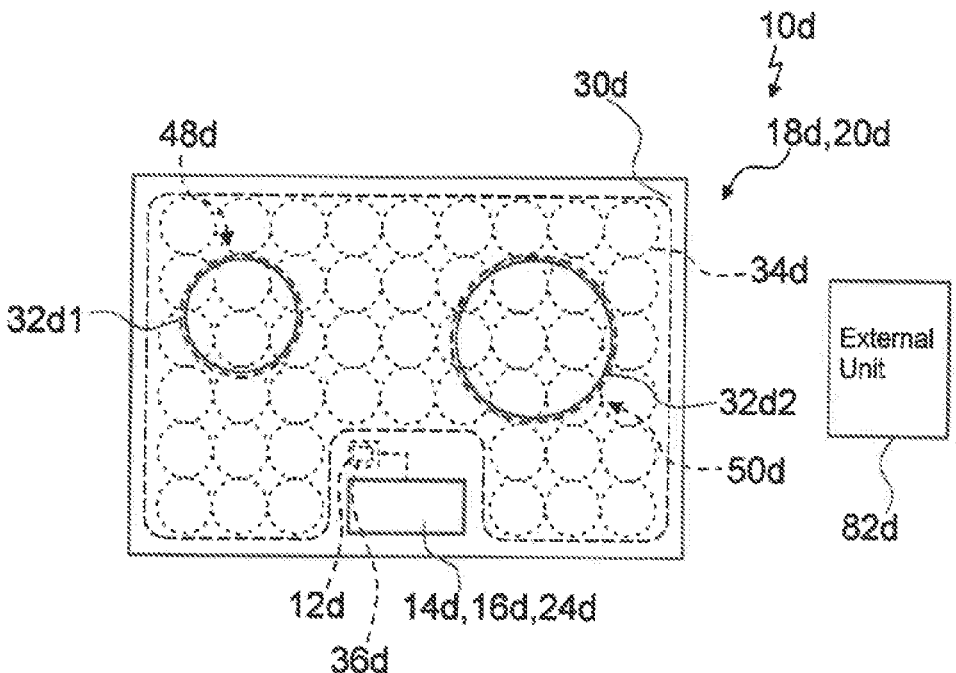
FIG. 12 shows a further alternative food preparation system, in a schematic plan view.
Figure 13:
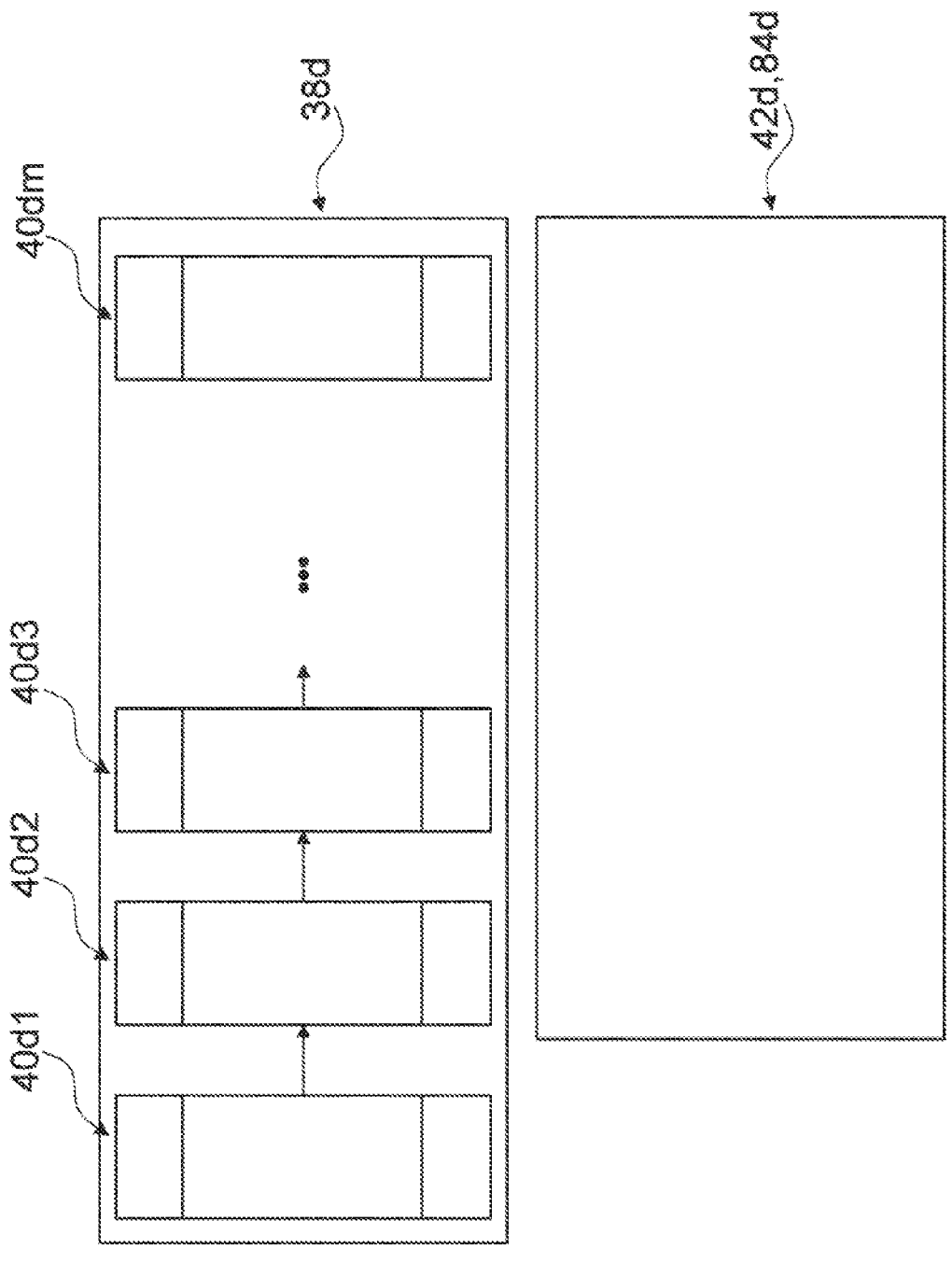
FIG. 13 shows a diagram of the food preparation system of FIG. 12 in which an exemplary process and an exemplary machine-user interaction are shown, in a schematic view.

Three further exemplary embodiments of the invention are shown in FIGS. 10 and 13. The following descriptions are substantially limited to the differences between the exemplary embodiments, wherein reference may be made to the description of the exemplary embodiment of FIGS. 1 to 9 relative to components, features and functions which remain the same. For differentiating between the exemplary embodiments, the letter a in the reference characters of the exemplary embodiment in FIGS. 1 to 9 is replaced by the letters b to d in the reference characters of the exemplary embodiment of FIGS. 10 to 13. Relative to components denoted the same, in particular relative to components with the same reference characters, in principle reference may also be made to the drawing and/or the description of the exemplary embodiment of FIGS. 1 to 9.

FIG. 10 shows by way of example an alternative food preparation system 10*b* which differs, in particular, from the food preparation system 10*a* shown in FIGS. 1 to 9 by an execution of a process step 40*b* of a process 38*b* and a machine-user interaction 42*b*.

In particular, the food preparation system 10*b* has a household appliance 20*b* and a further household appliance 22*b*. In particular, the food preparation system 10*b* has a cooking appliance 18*b* which is configured, in particular, integrally with the household appliance 20*b*. In particular, the household appliance 20*b* and/or the cooking appliance 18*b* is configured as a hob and advantageously as an induction hob. In the present exemplary embodiment, the further household appliance 22*b* is configured, in particular, as an oven.

A control unit 12*b* of the food preparation system 10*b* is designed, in particular, to execute the process 38*b* and the machine-user interaction 42*b* on different household appliances 20*b*, 22*b*, in particular on the household appliance 20*b* and on the further household appliance 22*b*. In particular, in an operating state the control unit 12*b* executes the process 38*b* and the machine-user interaction 42*b* on different household appliances 20*b*, 22*b*, in particular on the household appliance 20*b* and on the further household appliance 22*b*. The machine-user interaction 42*b* and the process 38*b* are designed, in particular, for execution on different household appliances 20*b*, 22*b*, in particular on the household appliance 20*b* and on the further household appliance 22*b*.

Figure 11:
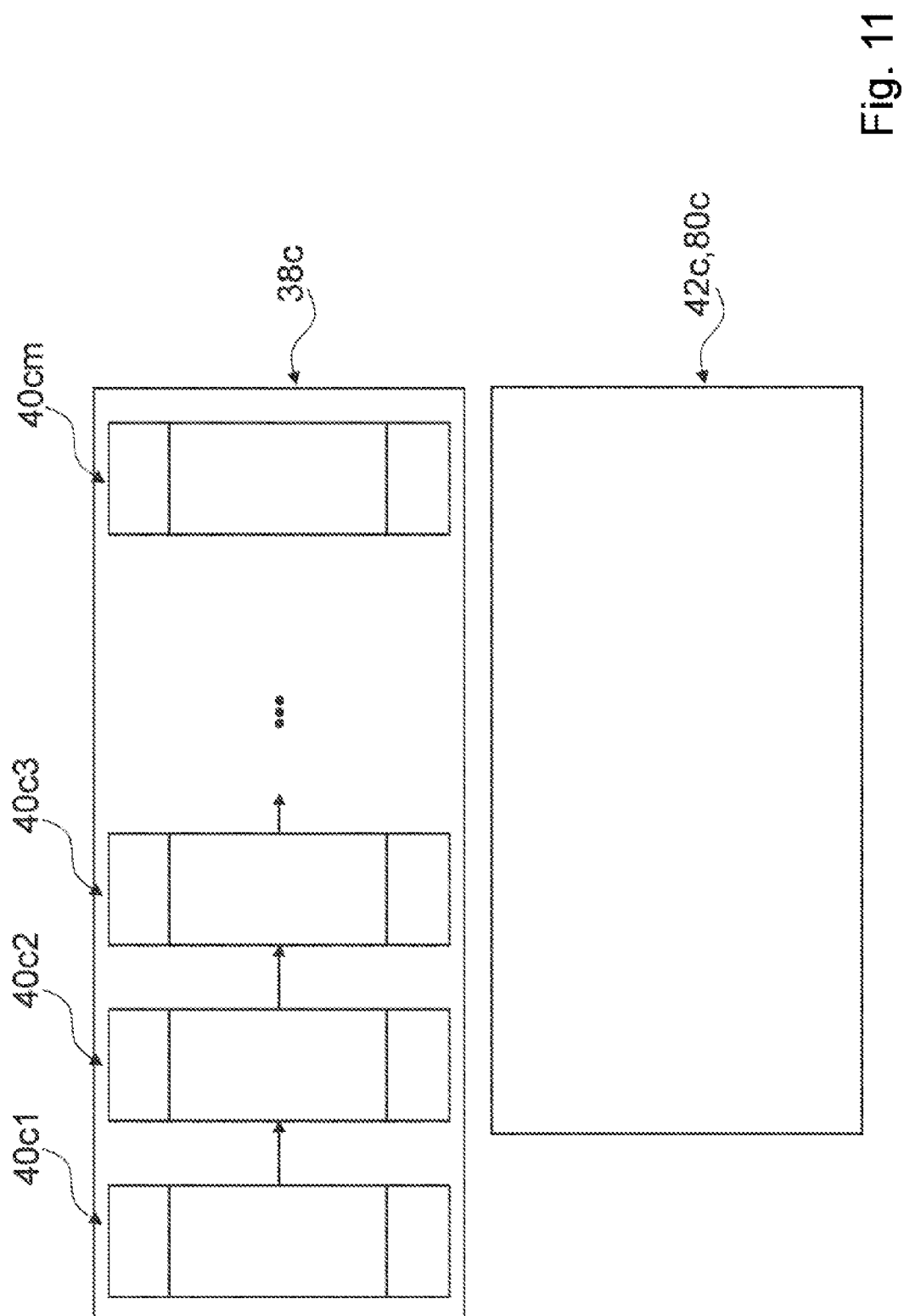
FIG. 11 shows a diagram of a further alternative food preparation system in which an exemplary process and an exemplary machine-user interaction are shown, in a schematic view.

FIG. 11 shows by way of example a further alternative food preparation system 10*c* which differs, in particular, from the food preparation system 10*a* shown in FIGS. 1 to 9 by a configuration of a machine-user interaction 42*c*.

The food preparation system 10*c* has, in particular, a control unit 12*c* which in an operating state guides through at least one process step 40*c* of at least one process 38*c*. In particular, during the guidance through the process 38*c*, the control unit 12*c* at least initiates a machine-user interaction 42*c* which is independent of the guidance through the process 38*c*. The control unit 12*c* executes the machine-user interaction 42*c*, in particular during the guidance through the process 38*c*.

In the present exemplary embodiment, the machine-user interaction 42*c* comprises, in particular, at least one, in particular individual, process which is different from a recipe and which is configured, in particular, differently from the process 38c which the control unit 12c guides through in an operating state. The, in particular individual, process of the machine-user interaction 42c and/or the machine-user interaction 42c is configured, in particular, as an individual process step 80c and/or as an individual cooking step and/or as an individual step.

FIGS. 12 and 13 show by way of example a further alternative food preparation system 10d which differs, in particular, from the food preparation system 10a shown in FIGS. 1 to 9, by a configuration of a machine-user interaction 42d.

The food preparation system 10d has, in particular, a control unit 12d which in an operating state guides through at least one process step 40d of at least one process 38d. In particular, during the guidance through the process 38d the control unit 12d at least initiates a machine-user interaction 42d which is independent of the guidance through the process 38d. The control unit 12d executes the machine-user interaction 42d, in particular during the guidance through the process 38d.

In particular, the food preparation system 10d has at least one and advantageously exactly one external unit 82d. The external unit 82d could have, for example, at least one mobile device and/or at least one data set and/or at least one network and/or at least one connection to at least one network and/or at least one computer. In particular, the control unit 12d and the external unit 82d are designed, in particular, for a wireless and/or wired communication.

In the present exemplary embodiment, the machine-user interaction 42d comprises at least a provision of at least one piece of information 84d provided by the external unit 82d.

The invention claimed is:

1. A food preparation system, comprising:
a cooking appliance;
an external unit distinct from the cooking appliance; and
a control unit configured to:
   communicate guidance to a user via a user interface (UI) of the cooking appliance regarding performance of a series of process steps of a recipe; and
   automatically initiate, in response to receiving information from the external unit, via the UI and during the guidance through the recipe, a machine-user interaction which is independent of the guidance;
   wherein the machine-user interaction comprises the information received from the external unit.

2. The food preparation system of claim 1, wherein the machine-user interaction comprises a further process step of a further process which is configured as a recipe, with the further process step configured as a further recipe step.

3. The food preparation system of claim 1, wherein the machine-user interaction comprises a process which is different from a recipe.

4. The food preparation system of claim 1, wherein the machine-user interaction and the recipe are designed for execution on a same household appliance.

5. The food preparation system of claim 1, wherein the machine-user interaction and the recipe are designed for execution on different household appliances.

6. The food preparation system of claim 1, wherein the control unit is configured to provide an output of the guidance and an output of the machine-user interaction at least in one section simultaneously via the user interface.

7. The food preparation system of claim 1, wherein the user interface includes an operating element configured as a rapid changeover switch.

8. The food preparation system of claim 7, wherein the control unit is designed to display the operating element differently as a function of a menu type displayed.

9. The food preparation system of claim 1, wherein the user interface includes an operating element which in a selected recipe is configured to select a subfunction of the recipe.

10. The food preparation system of claim 1, wherein the control unit is at least partially integrated in the cooking appliance.

11. The food preparation system of claim 10, wherein the cooking appliance is embodied as a hob.

12. A cooking appliance of a food preparation system comprising:
a control unit at least partially integrated in the cooking appliance, wherein the control unit is configured to:
   guide, using a user interface of the cooking appliance, a user through a process step of a process;
   automatically initiate, during the guidance through the process and in response to receiving information from an external unit distinct from the cooking appliance, a machine-user interaction which is independent of the guidance through the process.

13. The cooking appliance of claim 12, constructed in the form of a hob.

14. A method for operating a food preparation system, the method comprising:
guiding by a control unit via a user interface of a cooking appliance, through a process step of a process;
receiving information from an external unit distinct from the cooking appliance; and
in response to receiving the information, automatically initiating, during guidance by the control unit via the user interface through the process, a machine-user interaction which is independent of the guidance through the process.

15. The method of claim 14, wherein the process is configured as a recipe and comprises the process step which is configured as a recipe step.

16. The method of claim 14, further comprising providing with the control unit an output of the process step and an output of the machine-user interaction at least in one section simultaneously via the user interface.

17. The method of claim 14, wherein the control unit is at least partially integrated in the cooking appliance of the food preparation system.

\* \* \* \* \*